(12) United States Patent
Boireau et al.

(10) Patent No.: US 7,983,646 B2
(45) Date of Patent: Jul. 19, 2011

(54) TECHNIQUES TO REDUCE RADIO FREQUENCY NOISE

(75) Inventors: Olivier Boireau, Los Altos, CA (US); Gary Embler, Redwood City, CA (US); Avi Kopelman, Sunnyvale, CA (US); William Noellert, Moutain View, CA (US); Karl Townsend, Los Altos, CA (US); Chun W. Yeung, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 715 days.

(21) Appl. No.: 11/608,116

(22) Filed: Dec. 7, 2006

(65) Prior Publication Data
US 2008/0139155 A1    Jun. 12, 2008

(51) Int. Cl.
*H04B 1/10* (2006.01)
*H04K 3/00* (2006.01)

(52) U.S. Cl. .................. 455/296; 455/63.1; 455/67.13; 455/310

(58) Field of Classification Search ................. 455/63.1, 455/67.11, 296, 298, 310, 312
See application file for complete search history.

(56) References Cited

U.S. PATENT DOCUMENTS

| 7,194,269 B2 * | 3/2007 | Sydor ........................... 455/446 |
| 7,248,848 B2 * | 7/2007 | Matthews et al. ............. 455/296 |
| 2004/0053578 A1 * | 3/2004 | Grabon et al. .................. 455/73 |

FOREIGN PATENT DOCUMENTS

GB    2406410 A  *  3/2005

* cited by examiner

*Primary Examiner* — Lee Nguyen

(57) ABSTRACT

Various embodiments to reduce radio frequency noise are described. An apparatus may comprise a mobile computing device having a radio frequency noise reduction module to disable a radio frequency noise source in response to a receive active signal from a radio receiver. Other embodiments are described and claimed.

25 Claims, 2 Drawing Sheets

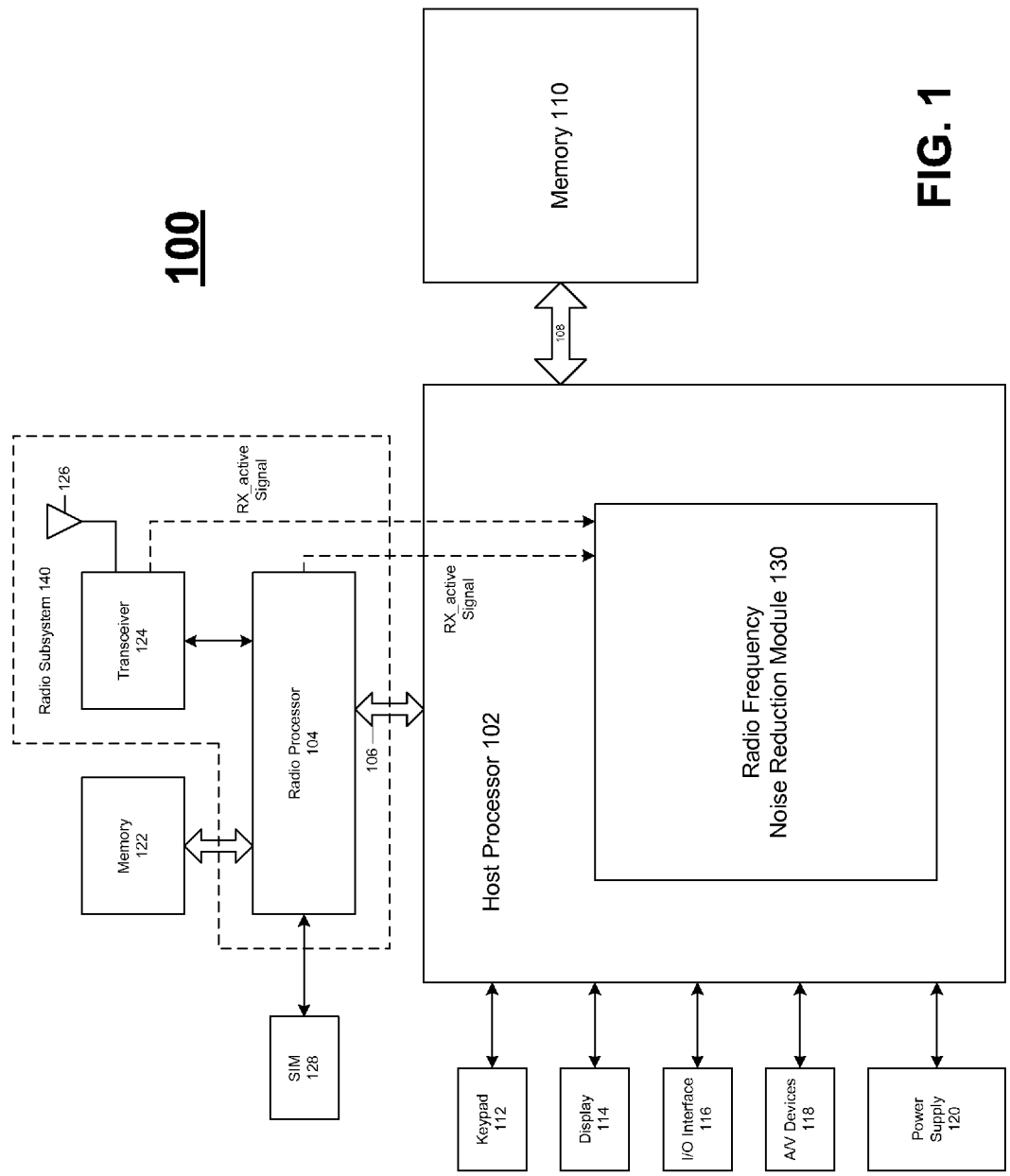

200

```
┌─────────────────────────────────────┐
│  RECEIVE A RADIO SIGNAL BY A RADIO  │
│             RECEIVER                │
│               202                   │
└─────────────────────────────────────┘
                  │
┌─────────────────────────────────────┐
│  SEND A RECEIVE ACTIVE SIGNAL BY THE│
│           RADIO RECEIVER            │
│               204                   │
└─────────────────────────────────────┘
                  │
┌─────────────────────────────────────┐
│   DISABLE A RADIO FREQUENCY NOISE   │
│  SOURCE IN RESPONSE TO THE RECEIVE  │
│           ACTIVE SIGNAL             │
│               206                   │
└─────────────────────────────────────┘
```

FIG. 2

TECHNIQUES TO REDUCE RADIO FREQUENCY NOISE

BACKGROUND

Electronic noise generated by a system, device or components may impact the ability of a wireless device to receive radio frequency (RF) signals. For example, a wireless device such as a smart phone may integrate various electronic elements into a single integrated device, such as one or more wireless transceivers, processors, memory devices, displays, cameras, batteries, and other components and peripherals. As a result, these and other elements may originate electronic noise that may interfere with an incoming RF signal and may couple with signals in the receive path of the wireless device resulting in performance degradation.

In an effort to reduce such noise, layout techniques may be employed when designing the wireless device to separate sources of noise from components sensitive to such noise. In some cases, RF shielding techniques may be employed within the wireless device to shield certain components of a radio subsystem from each other to prevent platform noise from coupling in the receive path. In an effort to increase user convenience and accessibility, however, smart phones are being implemented in ever decreasing form factors, further exacerbating the effects of RF noise and making RF shielding more difficult to implement in terms of cost, size and weight. Consequently, there may be a substantial need for techniques to reduce RF noise in a wireless system, platform or device in order to improve RF sensitivity and transceiver performance.

BRIEF DESCRIPTION OF THE DRAWINGS

FIG. 1 illustrates one embodiment of a mobile computing device.

FIG. 2 illustrates one embodiment of a logic flow.

DETAILED DESCRIPTION

Various embodiments may be directed to techniques to reduce RF noise for an electronic device, such as a mobile computing device. More particularly, some embodiments may reduce RF noise for a wireless receiver such as a radio receiver or transceiver to improve wireless communications. The RF noise may originate from various devices, components, peripherals or other elements implemented for a given mobile computing device, collectively referred to as system or platform noise. The system or platform noise may be sensed or perceived by the radio receiver as random or spurious noise, such as narrow or broadband noise. Such random broadband noise may adversely impact the power level sensitivity of the radio receiver to receive RF signals. As such, reducing such random platform noise may enhance the signal-to-noise ratio (SNR) of the radio receiver.

In one embodiment, for example, a mobile computing device may comprise a radio receiver, a RF noise reduction module coupled to the radio receiver, and one or more RF noise sources. Examples of RF noise sources may include a digital camera, display, and other similar peripherals, as described in more detail below. When operating, the RF noise sources may create energy that potentially interferes with receiving RF signals by the radio receiver via one or more antennas. For example, a reduction in radio receiver performance of 6 decibels (dB) may reduce the communication range of a cellular telephone by roughly fifty percent. In some cases, one or more RF noise sources for a mobile computing device may collectively degrade performance of a radio receiver by as much as 10 dB or more, which may drive the radio receiver out of specification and force dropped calls. Accordingly, the mobile computing device may use the RF noise reduction module to implement various source suppression techniques in an attempt to reduce, suppress or eliminate such interfering energy. Reducing or eliminating ambient system or platform RF noise may allow the radio receiver to better detect and receive radio signals from a given wireless network.

In one embodiment, for example, the radio receiver may receive a radio signal, such as an incoming telephone call from a cellular network (e.g., a GSM radiotelephone network). The radio receiver may send, assert or enable a receive active (RX_active) signal to the RF reduction module to indicate that the radio receiver is in operation. The RF reduction module may receive or detect the receive active signal from the radio receiver, and selectively disable, deactivate or otherwise terminate operations for one or more of the RF noise sources in response to the receive active signal. For example, the RF reduction module may disable a liquid crystal display (LCD) during a voice call to increase the SNR and clarity for the received call. In addition to disabling a RF noise source, or in lieu of disabling a RF noise source, the RF reduction module may disable a digital clock signal or clock source for the one or more RF noise sources. Digital clock signals, particularly those with severe transitions such as a square wave signal, may create sufficient RF noise to force dropped calls by the radio receiver. By turning off the digital clock signals, or the RF noise sources using the digital clock signals, ambient RF noise may be decreased thereby effectively increasing sensitivity for the radio receiver.

In addition to shutting off operations for one or more RF noise sources, the RF reduction module may use other RF noise reduction techniques to reduce or eliminate the undesired RF noise. In one embodiment, for example, the RF noise reduction module may be arranged to modify an interface or characteristics of an interface for a RF noise source in response to a receive active signal from a radio receiver to reduce RF noise generated by the RF noise source. For example, the RF noise reduction module may modify or shift a frequency used by the RF noise source to another frequency that is outside of the radio channel used by the radio receiver. In another example, the RF noise reduction module may reduce an operating voltage for the RF noise source. In yet another example, the RF noise reduction module may change operating modes for the RF noise source. In still another example, the RF noise reduction module may modify an operating power for the RF noise source. It may be appreciated that these are merely a few examples of the suppression techniques that may be implemented for the RF noise reduction module in an effort to modify interface behavior for a potential RF noise source to reduce or eliminate random or spurious noise. The embodiments, however, are not necessarily limited to these examples.

The various embodiments may provide several advantages over conventional RF noise reduction techniques. For example, some embodiments may provide superior RF noise reduction leading to enhanced performance for a radio receiver. In another example, some embodiments may require less RF shielding for various components of a mobile computing device. Reducing the need for RF shielding may reduce associated costs. Further, reduced RF shielding may also allow more design freedom for a given mobile computing device. In yet another example, some embodiments may allow a reduction in form factor for a mobile computing device since components producing RF noise may be more tightly integrated in a smaller space. Other advantages may be realized as well.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 1, the mobile computing device 100 may comprise a dual processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, it is worthy to note that the mobile computing device 100 may comprise any suitable processor architecture and/or any suitable number of processors consistent with the described embodiments.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The host processor 102 may also be coupled to various components, such as a keypad 112, a display 114, an input/output (I/O) interface 116, various audio/visual (A/V) devices 118, a power supply 120, and so forth. In some cases, the host processor 102 may further implement a digital interface to communicate digital signals between the host processor 102 and the various coupled components. Examples of such digital signals may include, without limitation, digital clock signals such as from an integrated circuit (IC) clock source. The digital clock signal is typically a signal used to coordinate the actions of two or more circuits. The clock signal oscillates between a high and low state, normally with a fifty percent duty cycle, and is usually a square waveform. Circuits using the clock signal for synchronization may become active at either the rising edge or falling edge, or both, of the oscillating clock signal. Consequently, the host processor 102 typically delivers a clock signal to the various components coupled to the host processor 102 in part to synchronize and control the coupled components.

The mobile computing device 100 may comprise an alphanumeric keypad 112 coupled to the host processor 102. The keypad 112 may comprise, for example, a QWERTY key layout and an integrated number dial pad. In some cases, the keypad 112 may comprise a thumbboard arranged for operation using the thumbs of a user. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a LCD such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an I/O interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various A/V devices 118 that support A/V capability of the mobile computing device 100. Examples of A/V devices 114 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more radio transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services. It may be appreciated that the term "transceiver" as used herein may describe a transmitter, a receiver, or both a transmitter and receiver.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

The mobile computing device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As shown in FIG. 1, the mobile computing device 100 may comprise or implement a RF noise reduction module 130 arranged to reduce or eliminate RF noise originating from one or more RF noise sources. The RF noise reduction module 130 may be implemented as part of the host processor 102 (as shown), or separate from the host processor 102, as desired for a given implementation. Further, the RF noise reduction module 130 may be implemented in hardware, software, or a combination of hardware and software, as desired for a given implementation. The embodiments are not limited in this context.

A RF noise source may comprise any device, component, peripheral, or other element of the mobile computing device 100 radiating RF noise signals that may potentially interfere with operations for transceiver 124. Of particular concern are those RF noise sources that use a digital signal that continuously toggles between high and low states, such as digital clock signals with square or sawtooth waveforms. The edge transitions of such digital clock signals create relatively high levels of RF noise as compared to other types of signals (e.g., sinusoidal waveforms). Furthermore, higher frequency signals tend to create higher amounts of RF noise interference as compared to lower frequency signals. Examples of RF noise sources may include, without limitation, keypad 112, display 114, I/O interface 116, A/V devices 118 (e.g., a digital camera or camcorder), power supply 120, SD cards, WiFi cards, SIM cards, memory units, and so forth. It is to be understood that the embodiments are not limited in this regard and that the RF noise sources may include any other type of source of RF signals which is consistent with the described embodiments. The embodiments are not limited in this context.

In various embodiments, the RF noise reduction module 130 may be arranged to reduce or prevent platform noise from coupling in the receive path of the transceiver 124. In an attempt to reduce RF noise, a RF shield may be mounted to the printed circuit board and/or may be incorporated into packaging that surrounds the electronic components. For example, an A/V device 118 such as a digital camera may have metal shielding surrounding the hardware elements of the digital camera. The RF shield, however, may be insufficient to prevent RF interference, and in some cases may be impractical due to size and form factor constraints. The RF noise reduction module 130 may replace or augment a RF shield in an attempt to reduce platform noise originating from the various hardware elements implemented with the mobile computing device 100.

In various embodiments, the RF noise reduction module 130 may be incorporated into parts of the radio subsystem 140 (e.g., transceiver 124 and/or radio processor 104) to provide an awareness of system or platform noise generated by the environment around the radio subsystem. The RF noise reduction module 130 may be arranged to sense and then mitigate and/or cancel the system or platform noise. In various implementations, the RF noise reduction module 130 may be arranged to prevent system or platform noise from interfering with the operation of a wireless communication device such as the radio transceiver 124. For example, operation of a digital camera (e.g., A/V devices 118) might produce enough RF noise to lower the sensitivity for the transceiver 124 sufficiently enough to miss a paging signal for a voice call from the cellular radiotelephone network. The RF noise reduction module 130 may be arranged to terminate or suspend operations for the digital camera (or other RF noise sources) while the transceiver 124 is receiving radio signals to effectively increase the sensitivity of the transceiver 124, thereby reducing or eliminating such problems.

The system or platform noise sensed by the radio subsystem may be generated by various noise sources present in the environment of the radio subsystem. The RF noise sources generating the system or platform noise may be internal and/or external to the radio subsystem. In some cases, for example, the RF noise sources may be located internal and/or external to the printed circuit board (PCB) of the radio subsystem. The system or platform noise may be sensed or perceived by the transceiver 124 as random broadband noise. Such random broadband noise may adversely impact the power level sensitivity of the transceiver 124 to receive RF signals. As such, reducing such random platform noise may enhance performance of the transceiver 124. Operations for the RF noise reduction module 130 may be described in further detail with reference to FIG. 2.

Operations for the mobile computing device 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using any desired hardware elements, software elements, or combination of both.

FIG. 2 illustrates a logic flow 200. Logic flow 200 may be representative of the operations executed by one or more embodiments described herein. The logic flow 200 may be performed by various systems and/or devices and may be implemented as hardware, software, and/or any combination thereof, as desired for a given set of design parameters or performance constraints. For example, the logic flow 200 may be implemented by a logic device (e.g., processor) and/or or logic comprising instructions, data, and/or code to be executed by a logic device. For purposes of illustration, and not limitation, the logic flow 200 is described with reference to FIG. 1. The embodiments are not limited in this context.

As shown in FIG. 2, a radio signal may be received by a radio receiver at block 202. A receive active signal may be sent by the radio receiver at block 204. A RF noise source may be disabled in response to the receive active signal at block 206. The embodiments are not limited in this context.

In one embodiment, for example, the logic flow may detect that the radio receiver is receiving the radio signal. In one embodiment, for example, the logic flow may disable a digital clock signal in response to the receive active signal. In one embodiment, for example, the logic flow may disable a digital clock source in response to the receive active signal. In one embodiment, for example, the logic flow may determine whether to disable the RF noise source based on a received signal strength indicator (RSSI). In one embodiment, for example, the logic flow may send the receive active signal during a pause interval for the radio signal. The embodiments are not limited in this context.

The operation of the above described structures and associated logic flow may be further described by way of the following examples. For example, assume the transceiver 124 receives a GSM radio signal. The transceiver 124 may detect the incoming received radio signal, and assert a receive active signal (RX_active) to indicate the transceiver 124 is in operation. The RF noise reduction module 130 may receive or detect the receive active signal, and disable a RF noise source in response to the receive active signal. The RF noise source may comprise, for example, a square wave digital clock signal (or other digital signal) delivered by the host processor 102 to the touch-screen display 114 and/or the A/V devices 118 (e.g., LCD_clk, CAMERA_clk) coupled to the host processor 102.

The RF noise reduction module 130 may disable the RF noise source in a number of different ways. For example, the RF noise reduction module 130 may terminate or suspend operations for a given RF noise source. This may be accomplished by sending control information to the RF noise source to terminate or suspend operations, or by disconnecting power to the RF noise source. In another example, the RF noise reduction module 130 may terminate or suspend the clock source for a given RF noise source. Operations for a RF noise source may be resumed once the receive active signal changes state.

In some embodiments the RF noise reduction module 130 may determine whether to terminate or suspend a given RF noise source based on a given SNR. A SNR is a ratio of a given transmitted signal to the background noise of the transmission medium. In general, a higher SNR is better since it provides a cleaner signal or more meaningful information. If the SNR level of the radio signal received by the transceiver 124 is above some defined threshold, then the RF noise reduction module 130 may not need to perform any RF noise reduction. If the SNR level is lower than some defined threshold, however, then the RF noise reduction module 130 may attempt to reduce RF noise by selectively disabling one or more active RF noise sources and/or digital signals communicated to the RF noise sources. The threshold determination as to whether to implement RF noise reduction by the RF noise reduction module 130 may also be implemented using various other signal characteristics, such as a RSSI or other form of channel measurement.

In some cases, there may be multiple RF noise sources in operation when the receive active signal is asserted. The RF noise reduction module 130 may terminate or suspend operations for some or all of the active RF noise sources. In one scenario, for example, the RF noise reduction module 130 may be arranged to terminate or suspend all active RF noise sources once the receive active signal is enabled. In another scenario, for example, the RF noise reduction module 130 may be arranged to selectively terminate or suspend a subset of the active RF noise sources. For example, the RF noise reduction module 130 may terminate or suspend operations for the active RF noise sources in accordance with a priority level assigned to each RF noise source. In this case, the RF noise reduction module 130 may terminate or suspend operations for the active RF noise sources in sequence starting with those RF noise sources having a lower priority level to those RF noise sources having a higher priority level. For example, assume that display 114 has a higher priority than the A/V device 118. The RF noise reduction module 130 may receive or detect the receive active signal, determine whether to perform RF noise reduction operations, and begin terminating or suspending operations for the A/V device 118 before the display 114. By implementing a feedback loop with the transceiver 124, a scenario may exist where deactivating the A/V device 118 may be sufficient RF noise reduction for a desired received-signal-strength (RSS) or SNR for the transceiver 124, thereby reducing or obviating the need to deactivate the display 114. Furthermore, the RF noise reduction module 130 may dynamically adjust the amount of RF noise reduction to implement for the transceiver 124 while the transceiver 124 remains in operation.

In various embodiments, the transceiver 124 itself may be used to detect and enable the receive active signal for use by the RF reduction module 130. This may depend upon which type of wireless network the transceiver 124 is designed for operation. In some cases, for example, the transceiver 124 may operate in accordance with a wireless protocol that allows for natural pauses in radio transmission, thereby allowing time periods or windows when the transceiver 124 is not receiving radio signals and may therefore assert the receive active signal. Examples of such wireless protocols include those protocols that allow pauses in radio communications to allow other devices to talk to a wireless access point, such as WiFi protocols (802.11x), Bluetooth protocols, GSM protocols, and so forth. If the transceiver 124 is a GSM transceiver, for example, the transceiver 124 may send or enable the receive active signal during a natural pause interval for the GSM radio signal, such as every 577 microseconds (μs) for a 4.28 millisecond (ms) frame burst used by GSM systems.

In various embodiments, a radio signal detector may be used to detect and enable the receive active signal for the RF reduction module 130. There are some wireless protocols that do not allow for interruptions in radio communications, such as CDMA protocols or WCDMA protocols, for example. If the transceiver 124 is a CDMA transceiver, for example, the transceiver 124 is always in operation when receiving CDMA radio signals. Consequently, the transceiver 124 may not necessarily be capable of asserting the receive active signal. In this case, it may be possible to implement a radio signal detector using some other element different from the transceiver 124. For example, a radio signal detector may be implemented using the radio processor 104, the host processor 102, or some other platform component or element. In another example, a dedicated radio signal detector may be implemented for the mobile computing device 100 to detect when the transceiver 124 is in operation, and assert the receive active signal for use by the RF noise reduction module 130. The embodiments are not limited in this context.

In some embodiments, a user interface may be implemented to allow a user to manually configure the mobile computing device 100 to terminate and suspend operations for one or more RF noise sources during operation of the transceiver 124. Although not necessarily needed for a GSM cellular radiotelephone network and other similar networks, such manual configuration options may be desirable for other types of cellular radiotelephone networks such as CDMA or WCDMA. Further, such manual configuration operations may be desirable whenever a user experiences difficulty in obtaining or sustaining a voice call connection or data session, such as when the mobile computing device 100 is in a moving vehicle, between cells, dense environments such as urban settings, and so forth. In this case, a user may actually disable certain elements of the mobile computing device 100 before, during or after receiving a voice call or data connection to improve connectivity. In addition, such manual configuration options may be desirable as feature differentiators for various carrier specific implementations.

In some embodiments, a frame buffer may be implemented by a RF noise source to buffer signals from the host processor 102 prior to terminating a clock signal or operations for the RF noise source. The RF noise source may then pull data from the frame buffer when appropriate, such as when the transceiver 124 is not in operation.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the embodiments.

The invention claimed is:

1. A mobile computing device comprising a processor to execute a radio frequency noise reduction module in response to a receive active signal from a radio receiver, said radio frequency noise reduction module operative to receive signal strength information from a feedback loop with said radio receiver and to dynamically modify one or more ambient system radio frequency noise sources to meet at least a predetermined signal strength, said one or more ambient system radio frequency noise sources are dynamically modified in accordance with said received signal strength information and a priority level assigned to each ambient system radio frequency noise source.

2. The mobile computing device of claim 1, said radio frequency noise reduction module to dynamically modify a digital clock signal in response to said receive active signal.

3. The mobile computing device of claim 1, said radio frequency noise reduction module to dynamically modify a digital clock signal for a display in response to said receive active signal.

4. The mobile computing device of claim 1, said radio frequency noise reduction module to dynamically modify a digital clock signal for a camera in response to said receive active signal.

5. The mobile computing device of claim 1, said radio frequency noise reduction module to dynamically modify a digital clock signal for a SD card in response to said receive active signal.

6. The mobile computing device of claim 1, said radio receiver to receive a radio signal, and send said receive active signal during a pause interval for said radio signal.

7. The mobile computing device of claim 1, comprising a user interface communicatively coupled to said radio frequency noise reduction module, said user interface to receive a user command to disable said radio frequency noise source.

8. The mobile computing device of claim 1, comprising an antenna to couple to said radio receiver.

9. The mobile computing device of claim 1, comprising:
a memory to store computer program instructions for said radio frequency noise reduction module;
a processor coupled to said memory to execute said computer program instructions; and
a thumbboard coupled to said processor to provide user commands to said processor.

10. The mobile computing device of claim 1, said radio frequency noise reduction module to shift a frequency used by said radio frequency noise source to another frequency that is outside of a radio channel used by the radio receiver.

11. The mobile computing device of claim 1, said radio frequency noise reduction module to reduce an operating voltage for said radio frequency noise source.

12. The mobile computing device of claim 1, said radio frequency noise reduction module to change operating modes for said radio frequency noise source.

13. The mobile computing device of claim 1, said radio frequency noise reduction module to modify an operating power for said radio frequency noise source.

14. A method, comprising:
receiving a radio signal by a radio receiver;
sending a receive active signal by said radio receiver;
sending signal strength information by said radio receiver using a feedback loop; and
in response to said receive active signal, dynamically modifying one or more ambient system radio frequency noise sources to meet at least a predetermined signal strength, said one or more ambient system radio frequency noise sources are dynamically modified in accordance with said received signal strength information and a priority level assigned to each ambient system radio frequency noise source.

15. The method of claim 14, comprising detecting that said radio receiver is receiving said radio signal.

16. The method of claim 14, comprising dynamically modifying a digital clock signal in response to said receive active signal.

17. The method of claim 14, comprising dynamically modifying a digital clock source in response to said receive active signal.

18. The method of claim 14, comprising determining whether to dynamically modify said ambient system radio frequency noise source based on a received signal strength indicator.

19. The method of claim 14, sending said receive active signal during a pause interval for said radio signal.

20. An article comprising a computer-readable storage medium comprising instructions that, if executed by a processor, enable a computing system to:
detect a radio signal received by a radio receiver;
send a receive active signal;
send signal strength information using a feedback loop; and
in response to said receive active signal, dynamically modify one or more ambient system radio frequency noise sources to meet at least a predetermined signal strength, said one or more ambient system radio frequency noise sources are dynamically modified in accordance with said received signal strength information and a priority level assigned to each ambient system radio frequency noise source in response to said receive active signal.

21. The storage medium of claim 20, further comprising instructions that if executed enable a computing system to dynamically modify a digital clock signal in response to said receive active signal.

22. The storage medium of claim 20, further comprising instructions that if executed enable a computing system to dynamically modify a digital clock signal for a display in response to said receive active signal.

23. The storage medium of claim 20, further comprising instructions that if executed enable a computing system to dynamically modify a digital clock signal for a camera in response to said receive active signal.

24. The storage medium of claim 20, further comprising instructions that if executed enable a computing system to send said receive active signal during a pause interval for said radio signal.

25. A mobile computing device comprising a processor to execute a radio frequency noise reduction module in response to a receive active signal from a radio receiver, said radio frequency noise reduction module operative to receive signal strength information from a feedback loop with said radio receiver and to dynamically modify one or more interfaces for one or more ambient system radio frequency noise sources to meet at least a predetermined signal strength, said one or more interfaces for one or more ambient system radio frequency noise sources are dynamically modified in accordance with said received signal strength information and a priority level assigned to each ambient system radio frequency noise source to reduce radio frequency noise generated by said one or more ambient system radio frequency noise sources.

* * * * *